US008223659B2

(12) United States Patent  (10) Patent No.: US 8,223,659 B2
Do et al.  (45) Date of Patent: Jul. 17, 2012

(54) RELAYING METHOD OF A MOBILE COMMUNICATION SYSTEM AND SYSTEM THEREOF

(75) Inventors: Mi-Sun Do, Suwon-si (KR); Eunhyun Kwon, Seoul (KR); Jongho Bang, Suwon-si (KR); Jaiyong Lee, Seoul (KR)

(73) Assignees: Samsung Electronics Co., Ltd., Suwon-Si (KR); Industry-Academic Cooperation Foundation, Yonsei University, Seoul (KR)

( * ) Notice: Subject to any disclaimer, the term of this patent is extended or adjusted under 35 U.S.C. 154(b) by 497 days.

(21) Appl. No.: 11/812,517

(22) Filed: Jun. 19, 2007

(65) Prior Publication Data

US 2008/0013459 A1  Jan. 17, 2008

(30) Foreign Application Priority Data

Jun. 20, 2006  (KR) .................. 10-2006-0055529

(51) Int. Cl.
*G01R 31/08* (2006.01)
(52) U.S. Cl. ........................................ 370/248
(58) Field of Classification Search .................. 370/203, 370/204–215, 229–240, 241–253, 310–337, 370/395.3, 395.4, 395.41, 395.42, 395.5, 370/395.52, 431–457, 458–463, 464–497, 370/498–522, 523–520, 521–529
See application file for complete search history.

(56) References Cited

U.S. PATENT DOCUMENTS

| | | | |
|---|---|---|---|
| 7,184,703 B1 * | 2/2007 | Naden et al. ................... 455/10 |
| 7,352,729 B2 * | 4/2008 | Fujiwara et al. .............. 370/338 |
| 7,720,020 B2 * | 5/2010 | Larsson ....................... 370/315 |
| 2004/0002336 A1 * | 1/2004 | Wu et al. ...................... 455/445 |
| 2004/0043782 A1 * | 3/2004 | Gupta .......................... 455/517 |
| 2004/0142716 A1 * | 7/2004 | Orlik et al. .................... 455/522 |
| 2004/0242154 A1 * | 12/2004 | Takeda et al. .................. 455/16 |
| 2005/0030930 A1 | 2/2005 | Cho et al. |
| 2005/0159111 A1 * | 7/2005 | Kim et al. ................. 455/67.14 |
| 2005/0159163 A1 * | 7/2005 | Chang et al. ................. 455/450 |
| 2006/0077906 A1 * | 4/2006 | Maegawa et al. ............ 370/254 |
| 2006/0136603 A1 * | 6/2006 | Morvan et al. ............... 709/248 |
| 2006/0264172 A1 * | 11/2006 | Izumikawa et al. ......... 455/11.1 |
| 2007/0201392 A1 * | 8/2007 | Ramachandran ............ 370/315 |

FOREIGN PATENT DOCUMENTS

| | | |
|---|---|---|
| KR | 10-2005-0013023 A | 2/2005 |
| WO | WO 2005/064872 A1 | 7/2005 |
| WO | WO 2005/067225 A1 | 7/2005 |

* cited by examiner

*Primary Examiner* — Kwang B Yao
*Assistant Examiner* — Jung-Jen Liu
(74) *Attorney, Agent, or Firm* — NSIP Law (57) ABSTRACT

A method for setting a path by a base station in a mobile communication system and a system thereof are provided. The base station measures quality of a link directly connected to the mobile terminal using the received signal, if a signal is directly received from a mobile terminal. If the signal is received via at least one relaying node, the base station calculates quality of an entire path determined taking quality of each link into account, depending on the signal received via the at least one relaying node. The base station compares the calculated quality of the entire path with the quality of the directly connected link, and determines an optimal path according to the comparison result. The base station sends a relaying request message to a relaying node corresponding to the optimal path. Upon receipt of a relaying response message from the relaying node, the base station configures new broadcast information and broadcasts the newly configured broadcast information.

20 Claims, 7 Drawing Sheets

RELAYING METHOD OF A MOBILE COMMUNICATION SYSTEM AND SYSTEM THEREOF

CROSS-REFERENCE TO RELATED PATENT APPLICATION

This application claims the benefit under 35 U.S.C. §119 (a) of a Korean Patent Application filed in the Korean Intellectual Property Office on Jun. 20, 2006 and assigned Serial No. 2006-55529, the disclosures of which is hereby incorporated by reference.

BACKGROUND OF THE INVENTION

1. Field of the Invention

The present invention relates generally to a mobile communication system. More particularly, the present invention relates to a relaying method for relaying transmission/reception data over an optimal path in a mobile communication system, and a system thereof.

2. Description of the Related Art

Generally, a mobile communication system is composed of a base station, a plurality of relaying nodes, and a plurality of mobile terminals. The mobile terminals are guaranteed mobility, and when the mobile terminal desires to transmit/receive data, it can directly transmit/receive data to/from the base station or can transmit/receive data to/from the base station via an adjacent relaying node. The operation of transmitting/receiving data to a destination via an intermediate node is called 'relaying'.

In order to relay data in this manner, the base station and the relaying nodes should detect (or comprehend) unique information, hop path and optimal path of nodes (base station, relaying nodes and mobile terminals) in a cell.

However, a conventional mobile communication system does not provide a method for determining an optimal path between nodes to provide the relaying, and selecting the path.

Accordingly, there is a need for an improved method and mobile communication system that provides relaying transmission and reception data over an optimal path between nodes.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a relaying method for relaying transmission/reception data over an optimal path in a mobile communication system, and a system thereof.

Another aspect of exemplary embodiments of the present invention is to provide a method for determining and selecting an optimal path by a base station in a mobile communication system.

Another aspect of exemplary embodiments of the present invention is to provide a method for determining and selecting an optimal path by a relaying node in a mobile communication system.

According to one aspect of exemplary embodiments of the present invention, there is provided a mobile communication system, in which a mobile terminal transmits an uplink signal, and a relaying node measures quality of a channel to the mobile terminal by detecting the uplink signal and transmits information including the measured quality to a base station. The base station measures quality of a channel to the relaying node using the transmitted information, measures quality of a channel to the mobile terminal using an uplink signal directly transmitted from the mobile terminal, determines an optimal path to the mobile terminal, sends a relaying request message to a relaying node corresponding to the optimal path, and upon receipt of a relaying response message from the relaying node, configures and broadcasts new broadcast information.

According to another aspect of exemplary embodiments of the present invention, there is provided a method for relaying data in a mobile communication system. The method includes transmitting, by a mobile terminal, an uplink signal, measuring, by a relaying node, quality of a channel to the mobile terminal by detecting the uplink signal, and transmitting information including the measured quality to a base station, and measuring, by the base station, quality of a channel to the relaying node using the transmitted information, measuring quality of a channel to the mobile terminal using an uplink signal directly transmitted from the mobile terminal, determining an optimal path to the mobile terminal, sending a relaying request message to a relaying node corresponding to the optimal path, and upon receipt of a relaying response message from the relaying node, configuring and broadcasting new broadcast information.

According to a further aspect of exemplary embodiments of the present invention, there is provided a method for setting a path by a base station in a mobile communication system, in which, if a signal is directly received from a mobile terminal, quality of a link directly connected to the mobile terminal is measured using the received signal. If the signal is received via at least one relaying node, quality of an entire path determined is calculated while taking into account quality of each link, depending on the signal received via the at least one relaying node. The calculated quality of the entire path is compared with the quality of the directly connected link, and an optimal path is determined according to the comparison result. A relaying request message is sent to a relaying node corresponding to the optimal path, and upon receipt of a relaying response message from the relaying node, new broadcast information is configured and the newly configured broadcast information is broadcasted.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well known functions and constructions are omitted for clarity and conciseness.

Definitions of the terms used herein will be given hereinbelow.

Base Station: equipment that routes data transmitted to multiple mobile terminals located in a cell, or transmits data received from multiple mobile terminals to a destination. To transmit/receive data in this manner, the base station periodically broadcasts system parameters, and configures and updates a routing table using information received from multiple mobile terminals.

Relaying Node: equipment for smooth data transmission/reception between a base station and a mobile terminal. For the smooth data transmission/reception, the relaying node can be installed in a low-signal strength area or a shadow area, and multiple relay nodes can be installed in a cell.

Mobile Terminal: guaranteed mobility, and provides various services to a user under the control of the base station.

Uplink Channel: a channel used for data transmission from the mobile terminal to the base station. This channel is allocated separately for each individual mobile terminal, and the mobile terminal can transmit/receive data over the allocated channel.

Downlink Channel: a channel used for data transmission from the base station to the mobile terminal.

A detailed description will now be made of a data routing method in a cell according to an exemplary embodiment of the present invention. Further, a description will be made of a method for selecting an optimal routing path.

Figure 1:
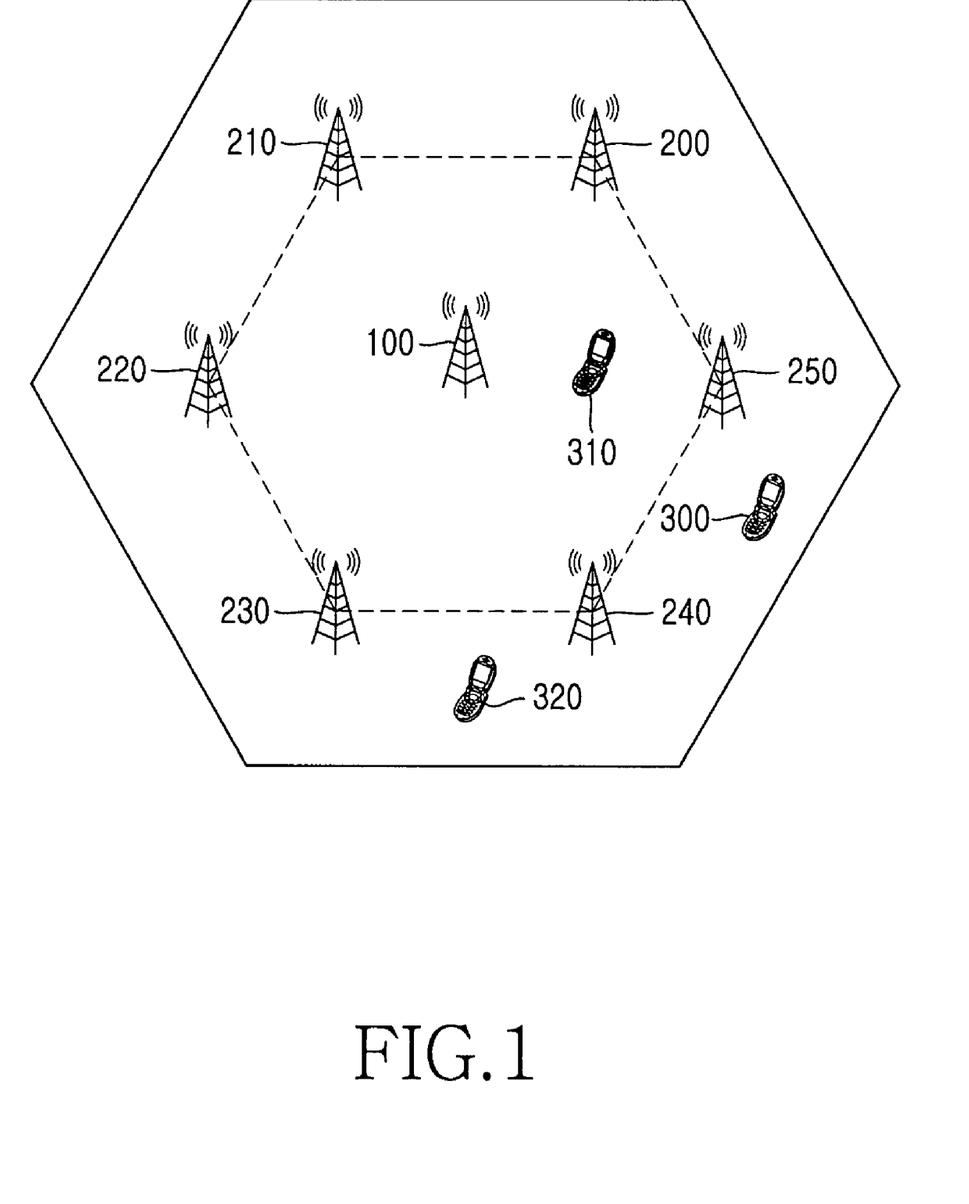
FIG. 1 is a diagram illustrating a configuration of a mobile communication system according to an embodiment of the present invention.

FIG. 1 is a diagram illustrating a configuration of a mobile communication system according to an exemplary embodiment of the present invention.

As illustrated, the mobile communication system according to an exemplary embodiment of the present invention includes a base station 100, a plurality of relaying nodes 200~250 for relaying data or signals transmitted/received to/from the base station 100, and a plurality of mobile terminals 300~320 which are located in coverage of the base station 100 and transmit/receive data via the base station 100 or the multiple relaying nodes 200~250.

The base station 100 according to an exemplary embodiment of the present invention controls the multiple relaying nodes 200~250 and the multiple mobile terminals 300~320, all of which are located in the cell. For this control, the base station 100 periodically configures or updates routing paths of the multiple mobile terminals 300~320, and determines an optimal path through the updated routing path. To determine the optimal path, the base station 100 selects an optimal path using signals directly received from the mobile terminals 300~320, and signals received via the relaying nodes 200~250. To select the optimal path, the base station 100 uses channel quality of uplink/downlink wire/wireless-connected between nodes. The base station 100 determines relaying of the data uploaded from the mobile terminal using the determined path. In order to relay data transmitted by the mobile terminal in this manner, the base station 100 broadcasts broadcast information to the multiple relaying nodes 200~250 or the multiple mobile terminals 300~320, located in the cell.

The multiple relaying nodes 200~250 according to an exemplary embodiment of the present invention can be installed or included in the cell. The relaying nodes 200~250 can be installed in a low-signal strength area where strength of a signal broadcasted from the base station 100 is low, or in a shadow area where the signal cannot reach. The relaying nodes 200~250 installed in such areas serve to smoothly relay data or signals exchanged between the base station 100 and the mobile terminals 300~320. The relaying nodes 200~250 perform decoding and forwarding on the data exchanged between the base station 100 and the mobile terminals 300~320, and also perform reconfiguration/reallocation-and-forwarding thereon. For the smooth data exchange between the base station 100 and the mobile terminals 300~320, the relaying nodes 200~250 verify the channel environments between the base station 100 and the mobile terminals 300~320 and the mobility of the mobile terminals 300~320 periodically or if needed. The relaying nodes 200~250 detect strength of signals exchanged with the base station 100 or the mobile terminals 300~320. In addition, the relaying nodes 200~250 determine relaying paths of uplink or downlink channels depending on the detected signal strength, or detect quality of the corresponding channels depending on signals received from the mobile terminals 300~320, and then can send a relaying request to the base station 100, or can approve a relaying request from the base station 100.

The mobile terminals 300~320 according to an exemplary embodiment of the present invention are guaranteed mobility that can freely move in the cell, and provide various services to users thereof.

As illustrated, an exemplary embodiment of the present invention provides one of a method capable of direct data exchange with the base station and a method capable of data exchange via the relaying nodes, according to channel qualities and current locations of the mobile terminals. An entity of selecting an optimal path in this manner can be either the base station or the relaying node.

Figure 2:
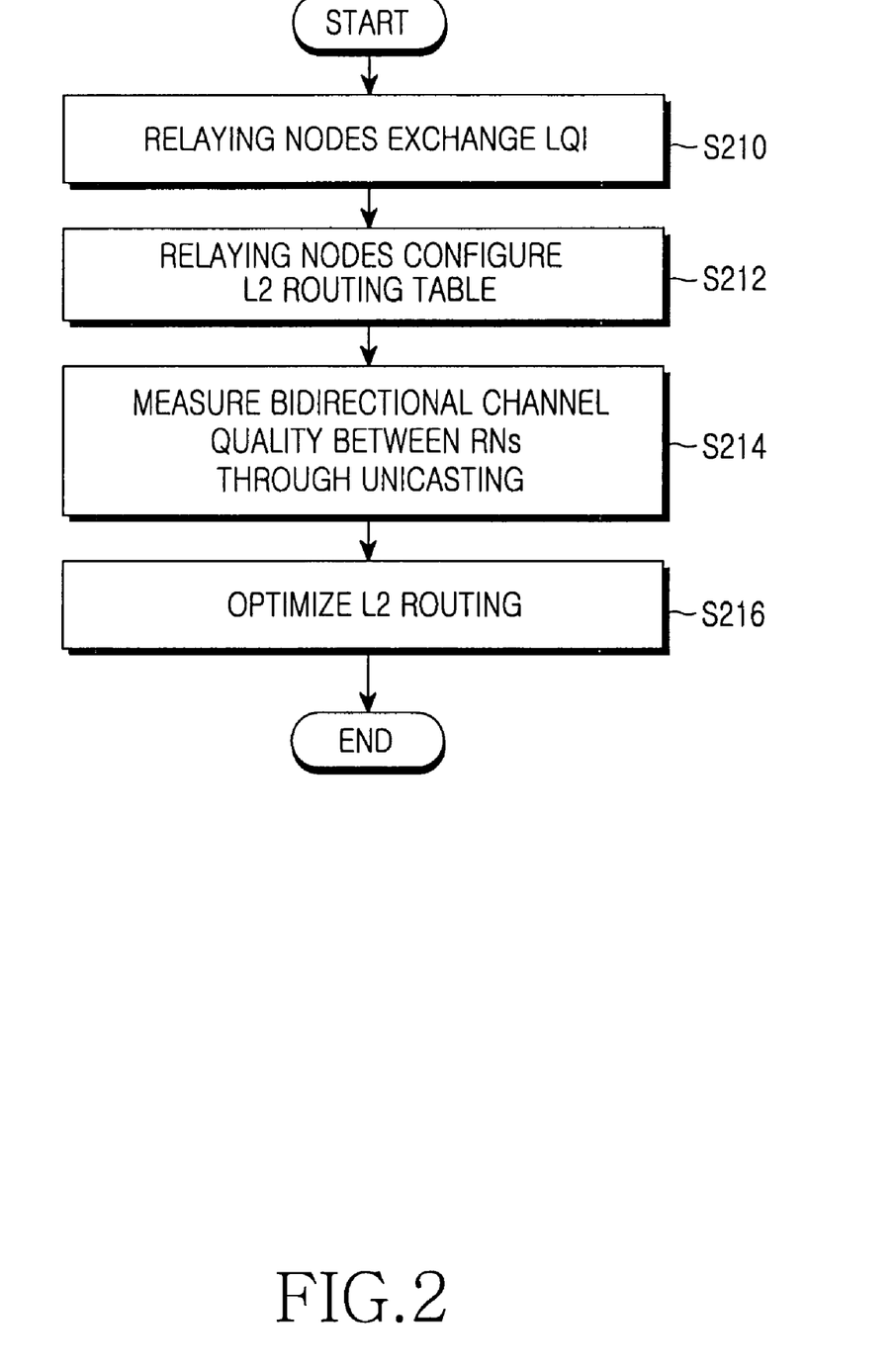
FIG. 2 is a diagram illustrating an L2 routing optimization method according to an embodiment of the present invention.

FIG. 2 is a diagram illustrating an L2 routing optimization method between a base station and relaying nodes according to an exemplary embodiment of the present invention.

Figure 3:
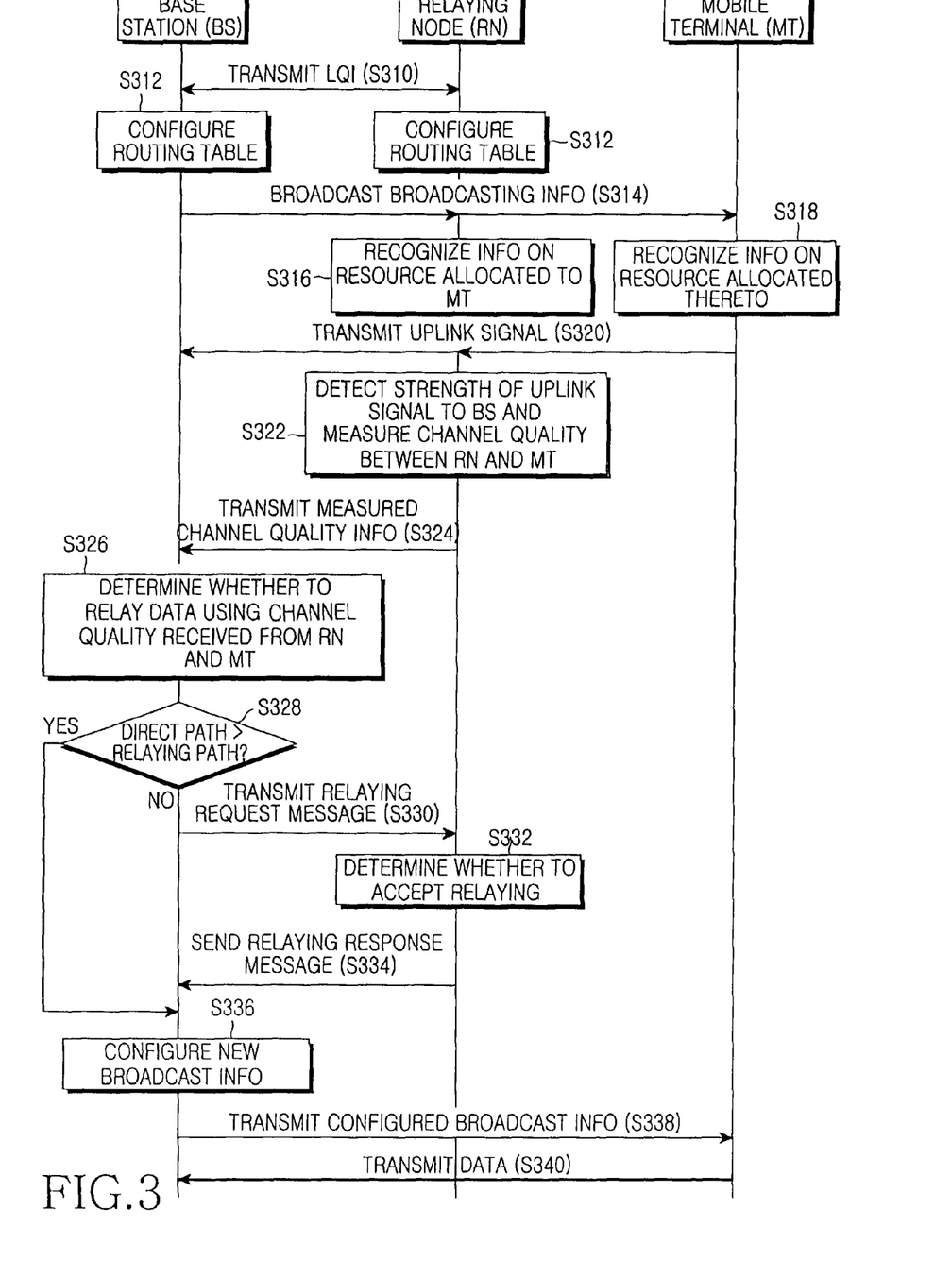
FIG. 3 is a flowchart illustrating a link path setting method in a mobile communication system according to an embodiment of the present invention.

To provide relaying according to an exemplary embodiment of the present invention, routing configuration between nodes (base station and relaying nodes) in the system should be performed in advance. FIG. 3 shows a method for optimizing routing of a mobile terminal through relaying control during communication between a base station and a mobile terminal, based on the method of FIG. 2.

As illustrated, each relaying node exchanges Link Quality Information (LQI) as a cost function over a mutual path in step S210. The exchange of LQI is achieved through broadcasting by each relaying node. Herein, the 'mutual path' refers to a path between the relaying node and the base station and/or a path between different relaying nodes. The LQI includes multi-hop link quality. The multi-hop link quality includes the number of hops and the current Channel Quality Information (CQI) of each hop, and CQI of each hop can be indicated by a burst profile such as Downlink Interval Usage Code (DIUC) and Uplink Interval Usage Code (UIUC). The DIUC and UIUC are associated with burst profile information, and mean information on modulation, coding, and error correcting.

After exchanging the LQI in step S210, each relaying node configures a Layer 2 (L2) routing table in step S212. In this manner, the base station and each relaying node configure an L2 routing table in the base station, composed of BS (Base Station) and RNs (Relaying Nodes), using LQIs received from other relaying nodes. The configured L2 routing table has a tree structure centered on the base station. The L2 routing table, configured in the base station and each relaying node, includes identifiers (IDs) of nodes constituting the tree structure, and CQIs between the nodes.

After configuring the L2 routing table in step S212, each relaying node measures bidirectional channel quality (or CQI) between relaying nodes in step S214. The channel quality measurement is achieved through unicasting. The bidirectional channel is divided into a reception channel and a transmission channel. The reception channel quality can be detected through measurement of pilot signal or Media Access Control (MAC) Protocol Data Unit (PDU) received from the base station or another relaying node, and to detect the transmission channel quality, the relaying node can send a channel report request (REP-REQ) message to the base station or another relaying node, and then receive a channel report response (REP-RSP) message from them.

After measuring the bidirectional channel quality between relaying nodes in step S214, each relaying node or the base station optimizes L2 routing in step S216. The optimization is optimization between the base station and the relaying nodes, or optimization between different relaying nodes. DIUC and UIUC can be found by converting Downlink Channel Descriptor (DCD) and Uplink Channel Descriptor (UCD) into a data rate. The optimization contributes to an increase in throughput. The relaying method according to an exemplary embodiment of the present invention can be performed using the routing table configured in step S212, or MAC layer relaying can be performed through the routing technique optimized in step S216.

FIG. 3 is a flowchart illustrating an uplink/downlink path setting method in a mobile communication system according to an exemplary embodiment of the present invention.

As illustrated, the mobile communication system according to an exemplary embodiment the present invention includes a base station, a plurality of relaying nodes, and a plurality of mobile terminals.

In the mobile communication system, each relaying node in a cell periodically transmits a cost function to a base station and other relaying nodes in step S310. The cost function includes LQI. The LQI includes unique information of the relaying node, path information between the base station and other relaying nodes, CQI between a mobile terminal and the relaying node itself, and hop information between the nodes. That is, each relaying node broadcasts information on the number of hops over which it is connected to other relaying nodes or mobile terminals, uplink/downlink channel status of each individual hop, and quality of the channel. The base station and each relaying node receive the LQI and update a routing table depending thereon.

When the mobile terminal communicates with the base station, all relaying nodes in the cell can transmit CQIs to the base station or other adjacent relaying nodes using the following technique.

In the mobile communication system, when the base station communicates with the mobile terminal, all relaying nodes analyze UCD and Uplink-MAP (UL-MAP), broadcasted by the base station, and Uplink PDU received from the mobile terminal. The relaying nodes acquire UIUC information of a burst profile from the UCD, and also acquire user data field information for the mobile terminal from the UL-MAP. In addition, the relaying nodes acquire Uplink CQI (UCQI) by measuring a pilot or user PDU of the mobile terminal. The UCQI includes Received Signal Strength Indication (RSSI) and Carrier-to-Interference and Noise Ratio (CINR). Upon receipt of the UCQI, the relaying node reports the result to the base station according to a predetermined condition.

Upon receipt of UCQIs from multiple relaying nodes in step S310, the base station and the relaying node each configure a routing table using the UCQIs received from the multiple relaying nodes in step S312. The configured routing table includes unique information of all nodes (base station, relaying nodes, and mobile terminals) in the cell, hop information between the nodes, and unique information of each node.

After configuring the routing table, the base station broadcasts, in the cell, broadcast information including control information and channel information necessary for communication with the relaying node and the mobile terminal based on the configured routing information in step S314. The broadcast information is broadcasted to multiple relaying nodes or multiple mobile terminals located in the cell. The broadcast information is broadcast over Downlink-MAP (DL-MAP)/UL-MAP message and UCD/DCD message. The MAP messages have information used for allocating transmission/reception resources separately for each individual relaying node and mobile terminal, and are used for notifying, to the relaying nodes and the mobile terminals, the dynamic resource allocation result, or locations of subchannels and the number of the subchannels. UCD indicates a MAC message indicating physical layer characteristics in the uplink, and DCD indicates a MAC message indicating physical layer characteristics of the downlink layer.

Upon detecting the broadcast information broadcasted by the base station in step S314, the relaying node acquires information on the resource allocated to the mobile terminal in step S316. The allocated resource information can be recognized through UL-MAP or UCD. The mobile terminal also recognizes information on the resource allocated thereto using UL-MAP and UCD in step S318. After recognizing the resource information in step S318, the mobile terminal transmits an uplink signal to the base station according to the recognized resource information in step S320. The uplink signal includes a pilot signal.

The uplink signal transmitted to the base station is also detected by the relaying node, and the relaying node analyzes the uplink signal and measures signal strength depending on the detected signal in step S322. That is, the relaying node can detect channel quality and data rate between the relaying node and the mobile terminal depending on the analyzed signal. Strength of the signal can be either an RSSI value or a CINR value. After detecting CQI in step S322, the relaying node transmits UCQI with the detected CQI to the base station in step S324.

The UCQI can include both or one of an RSSI mean and a CINR mean. The relaying node can transmit a UCQI report message either periodically or aperiodically. In the latter case of the aperiodical transmission, the relaying node can bind multiple messages for multiple periods and transmit the bound messages at a time. With use of a predetermined algorithm, the relaying node can reduce the amount of UCQI information to be transmitted to the base station. If the relaying node transmits the UCQI report messages to the base station after binding in this manner, overhead due to message transmission is reduced.

Table 1 shows a format of a UCQI report message according to an embodiment of the present invention.

TABLE 1

| Syntax | Size | Notes |
|---|---|---|
| UCQI-RPT_Message Format( ) | | RN→BS (Unicast) |
| Type | 4 bits | |
| Reserved | 4 bits | |
| Mobile CID | 16 bits | |
| MS CINR mean | 8 bits | DB |
| MS RSSI mean | 8 bits | DBm |

As shown in Table 1, the UCQI report message includes a 'Type' field, a 'Reserved' field, a 'Mobile CID' field indicating a Connection ID (CID) of a mobile terminal, a 'MS CINR mean' field indicating a CINR mean of a mobile terminal or mobile station (MS), and a 'MS RSSI mean' field indicating an RSSI mean of a mobile terminal.

Upon directly receiving the pilot signal transmitted by the mobile terminal in step S320, the base station, like the relaying node, analyzes an uplink signal transmitted from the mobile terminal to the base station, measures signal strength thereof, and detects channel quality, CINR and data rate between the mobile terminal and the base station depending on the measured signal strength.

A series of the processes S310~S324 is performed in all relaying nodes and mobile terminals in the cell, rather than performed in one relaying node or mobile terminal. Upon receipt of CQIs from multiple relaying nodes in this way, the base station compares a data rate based on the received CQIs with a data rate directly received from the mobile terminal. Based on the comparison result, the base station determines an optimal path for downlinking data to the mobile terminal or for uplinking data from the mobile terminal to the base station, in step S326. That is, the base station determines an optimal path taking into account channel status between the base station and relaying nodes, channel status between the relaying node and the mobile terminal, and channel quality level between the base station and the mobile terminal. To determine the optimal path, the base station determines which channel path is higher in data rate, CINR, or channel quality.

If a quality level of the channel directly connected between the base station and the mobile terminal is higher in data rate than a quality level of the relayed channel in step S328, the base station sets the directly connected channel as its own channel to the mobile terminal. In steps S336 and S338, the base station newly configures broadcast information including the set channel, and then broadcasts the broadcast information to all nodes in the cell.

However, if data relaying over the relaying node is higher in data rate in step S328, the base station sends a relaying request message to the relaying node in step S330. The relaying request message includes an ID of the relaying node, an ID of the mobile terminal, and UIUC and DIUC to be used for relaying. The UIUC and DIUC are associated with burst profile information, and mean information on coding and error correcting.

Table 2 shows a format of a relaying request message according to an exemplary embodiment of the present invention.

TABLE 2

| Syntax | Size | Notes |
|---|---|---|
| REL-REQ_Message Format( ) | | |
| Type | 4 bits | |
| Request | 2 bits | 00: relaying 01: no relaying |
| Direction | 2 bits | 01: uplink 10: downlink |
| Relay Node ID | 16 bits | |
| Relaying CID | 16 bits | |
| UIUC or DIUC | 16 bits | |

As shown in Table 2, the relaying request (REL-REQ) message includes a 'Request' field indicating relaying request '00' or no-relaying request '01', a 'Direction' field used for identifying uplink or downlink, a 'Relay Node ID' field indicating an ID of the relaying node, a 'Relaying CID' field indicating a CID of the mobile terminal to be relayed, and a 'UIUC or DIUC' field.

Upon receipt of the relaying request message from the base station in step S330, the relaying node determines in step S332 whether to perform relaying depending on the relaying request message. In response to the received relaying request message, the relaying node can unconditionally approve the relaying, or can determine whether to perform relaying while taking its capacity into account. As a result of the determination, the relaying node sends to the base station a relaying response message including information indicating possibility/impossibility of the relaying in step S334.

Table 3 shows a format of a relaying response message according to an exemplary embodiment of the present invention.

TABLE 3

| Syntax | Size | Notes |
|---|---|---|
| REL-RSP_Message Format( ) | | |
| Type | 4 bits | |
| Confirmation Code | 2 bits | 00: relaying 01: no relaying |
| Direction | 2 bits | 01: uplink 10: downlink |
| Relay Node ID | 16 bits | |
| Relaying CID | 16 bits | |
| UIUC or DIUC | 16 bits | |

As shown in Table 3, the relaying response (REL-RSP) message includes a 'Confirmation Code' field indicating relaying request '00' or no-relaying request '01', a 'Direction' field used for identifying uplink or downlink, a 'Relay Node ID' field indicating an ID of the relaying node, a 'Relaying CID' field indicating a CID of the mobile terminal to be relayed, and a 'UIUC or DIUC' field.

Upon receipt of the relaying response message in step S334, the base station newly configures or updates routing information for the mobile terminal in step S336. The relaying response message includes therein information indicating whether the relaying node will perform relaying. Thereafter, the base station broadcasts broadcast information including resource allocation information for the updated routing path in step S338. When an optimal uplink channel is formed between the base station and the multiple relaying nodes in the cell, and between the base station and the multiple mobile terminals in the cell through the execution of the processes S310~S338, the mobile terminal transmits desired transmission data to the base station over the formed optimal uplink channel or the optimal relaying path in step S340. In reverse, when the base station downloads data to the mobile terminal, it uploads in step S340 the data using the broadcast information configured in step S336.

Figure 4A:
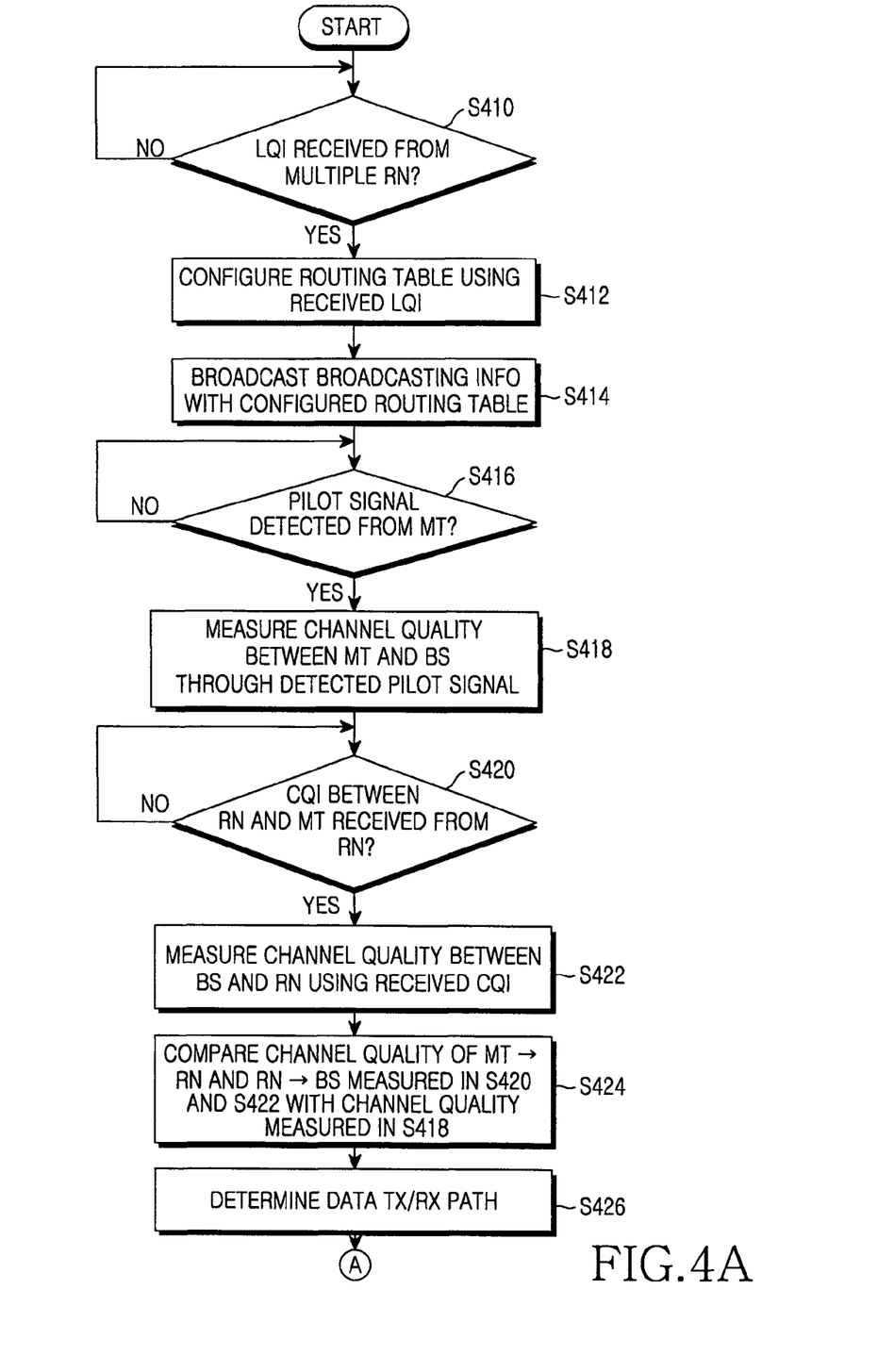
FIGS. 4A and 4B are flowcharts illustrating a path setting method of a base station in a mobile communication system according to an embodiment of the present invention.
Figure 4B:
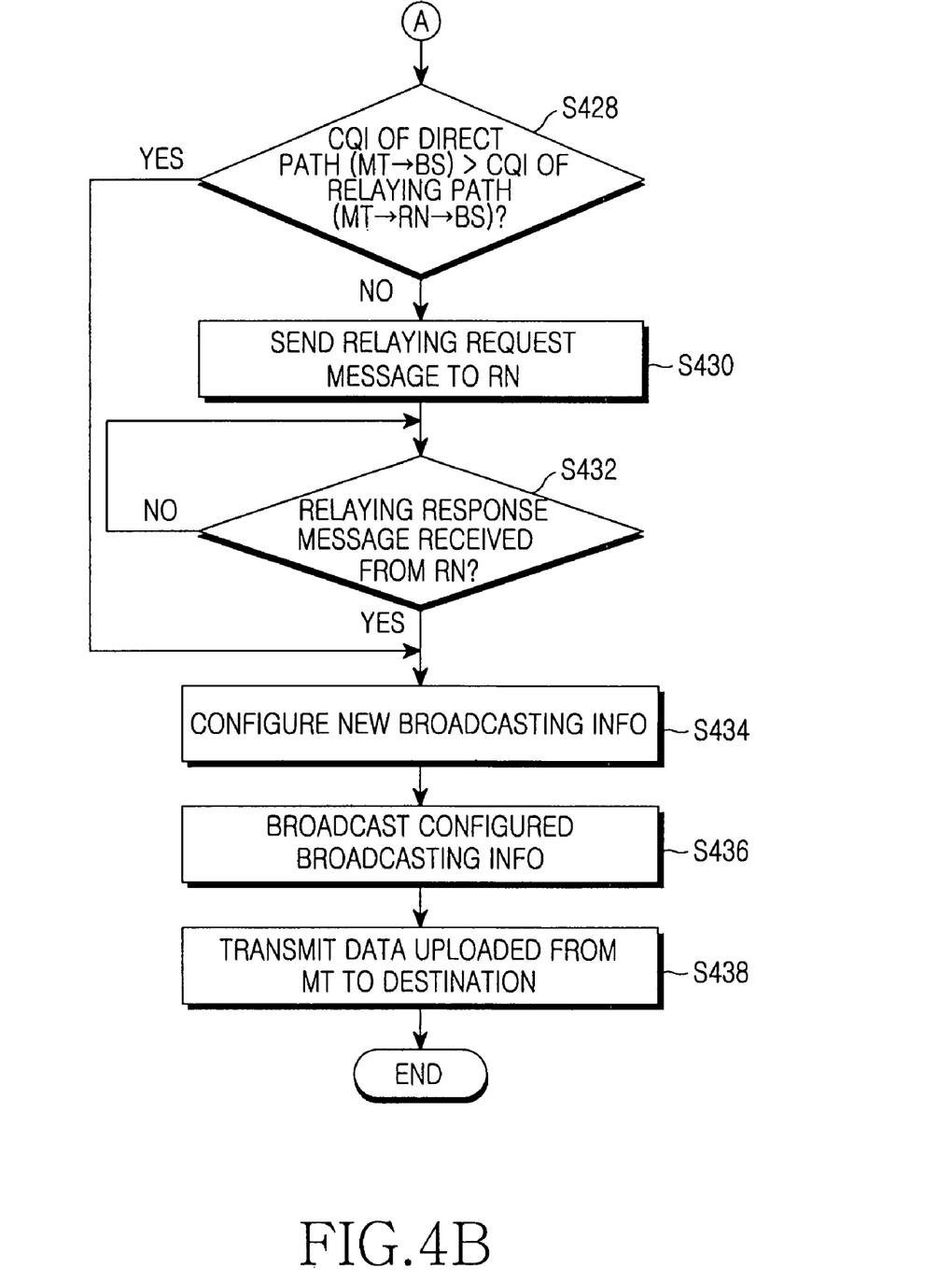

FIGS. 4A and 4B are flowcharts illustrating a path setting method of a base station in a mobile communication system according to an exemplary embodiment of the present invention.

The base station, based on CQI information received from a relaying node, compares a data rate being relayed over the relaying node with a data rate directly received from the mobile terminal. The base station also determines whether to provide relaying for the mobile terminal and selects a relaying path according to the comparison result.

Referring to FIGS. 4A and 4B, upon receipt of LQIs from multiple relaying nodes, the base station configures a routing table between the base station and the relaying node using the received LQIs in steps S410 and S412. The LQI includes path information between the base station and other relaying nodes, hop information between nodes (base station, relaying node, and mobile terminal), and data rate and channel quality of each node. After configuring the routing table in step S412, the base station generates broadcast information including the configured routing table and broadcasts the generated broadcast information in step S414. The generated broadcast information includes therein unique information of multiple relaying nodes and multiple mobile terminals in the cell, and hop information thereof. All relaying nodes in the cell can receive this broadcast information.

A description will now be made regarding communication between the base station and the mobile terminal. It is assumed herein that at first, the mobile terminal and the base station directly communicate with each other. Upon detecting an uplink signal, that is, pilot signal, from the mobile terminal, the base station measures channel quality, CINR and data rate between the mobile terminal and the base station using the detected pilot signal in steps S416 and S418. In step S418, the channel quality can be measured depending on strength of the received uplink signal. The strength of the uplink signal can be either an RSSI or a CINR.

After measuring the channel quality between the base station and the mobile terminal in step S418, the base station determines in step S420 whether CQI between the relaying node and the mobile terminal has been received from the relaying node. The CQI received in step S420 can be information that is transmitted from the mobile terminal to the base station via at least one relaying node. The channel quality between the relaying node and the mobile terminal is measured by the relaying node. This measurement method can be equal to the measurement method performed in step S418 by the base station, and an example thereof will be described with reference to FIG. 5.

If it is determined in step S420 that CQI between the relaying node and the mobile terminal has been received, the base station measures in step S422 channel quality, CINR, and data rate between the base station and the relaying node using the received CQI information.

In step S424, the base station compares the channel quality between the mobile terminal and the relaying node and the channel quality between the relaying node and the base station, measured in steps S420 and S422, with channel quality and data rate between the mobile terminal and the base station, measured in step S418.

In an exemplary implementation, after the channel quality between the mobile terminal and the base station was measured in step S418, the channel quality between the nodes is performed in steps S420 and S422. However, in an alternative exemplary implementation, step S418 can be performed after steps S420 and S422.

After step S424, the base station determines an optimal path between the base station and the mobile terminal depending on the measured channel qualities between the nodes in step S426. The base station can determine the optimal path using multiple equations described hereinbelow. After determining the optimal path in step S426, the base station determines in step S428 whether the optimal path is an interval between the base station and the mobile terminal or an interval connected to the mobile terminal via the relaying node.

If it is determined that the optimal path is the interval directly connected between the base station and the mobile terminal, the base station configures broadcast information by allocating resources for the mobile terminal on the current path in step S434. If the relaying path via the relaying node located between the base station and the mobile terminal is higher in channel quality, the base station sends a relaying request message to the relaying node in steps S428 and S430. The relaying request message is a request message for relaying an uplink signal of the mobile terminal. This message includes an ID of the relaying node, an ID of the mobile terminal, and UIUC and DIUC to be used for the relaying. Upon receipt of a relaying response message from the relaying node in response to the relaying request message, the base station changes corresponding burst profile and scheduling information for the mobile terminal determined to be relayed, and newly configures broadcast information including the optimal path in step S434. The base station or the relaying node can send the relaying request message or the relaying response message at stated periods by binding several messages. In step S436, the base station broadcasts the broadcast information configured in step S434.

Thereafter, the mobile terminal, receiving the broadcast information, uploads data via the optimal path. Upon receipt of the uploaded data, the base station transmits in step S438 the received data to the mobile terminal corresponding to a destination of the data, or to another base station.

Figure 5:
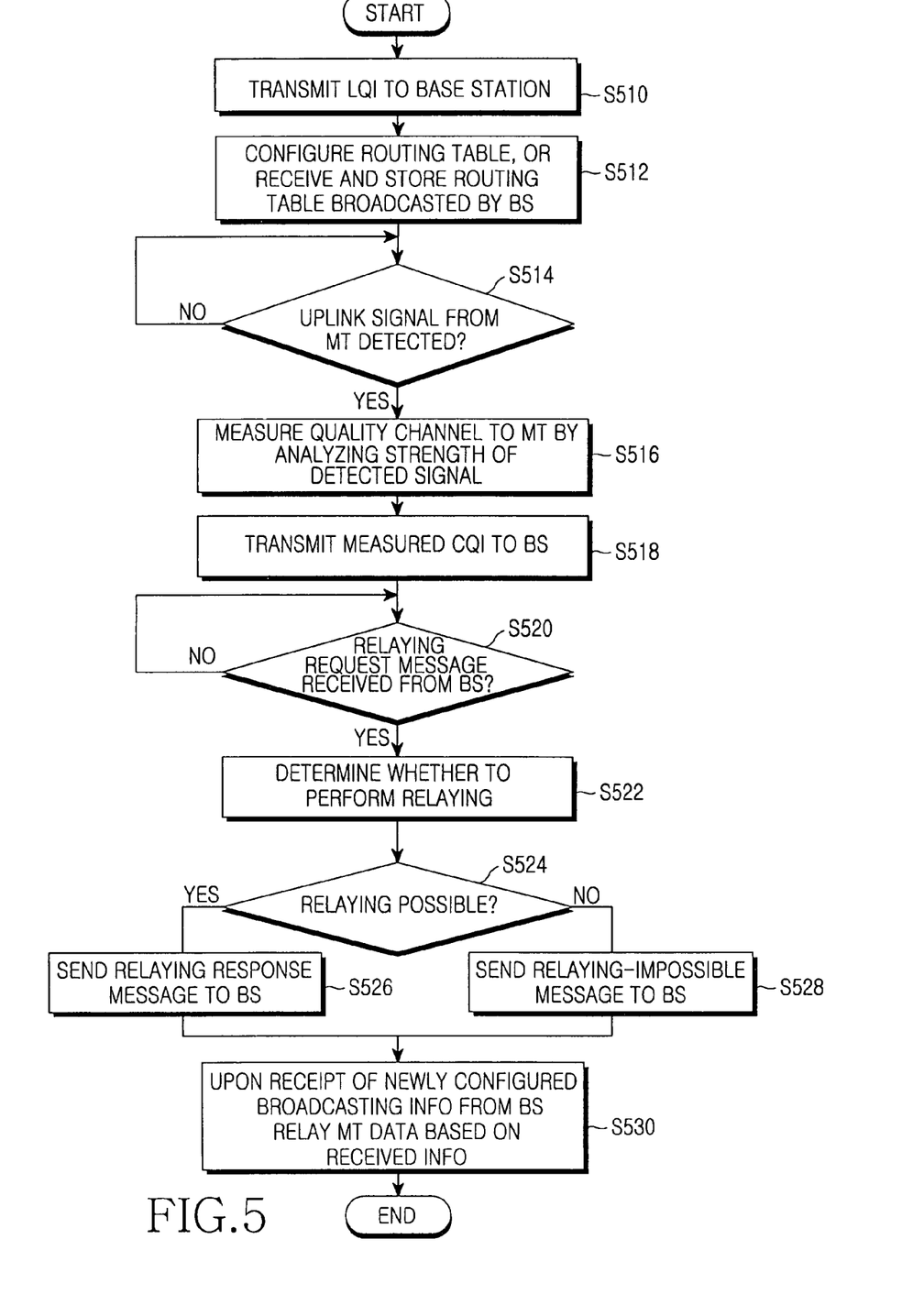
FIG. 5 is a flowchart illustrating a path setting method of a relaying node in a mobile communication system according to an embodiment of the present invention.

FIG. 5 is a flowchart illustrating a path setting method of a relaying node in a mobile communication system according to an exemplary embodiment of the present invention.

As illustrated, in the mobile communication system, a relaying node located in a cell transmits, in step S510, LQI to a base station or other relaying nodes, periodically or when there is a change in the LQI. The LQI includes path information, hop information, and CQI between the relaying node itself and the base station or the other relaying nodes. Upon receipt of the LQI, the base station or other relaying nodes configure a routing table using the received LQI. The base station can broadcast the broadcast information including the configured routing table to all relaying nodes in the cell. The relaying node also configures a routing table, or receive/stores the routing table broadcasted by the base station in step S512.

Meanwhile, a mobile terminal transmits an uplink signal to the base station. The uplink signal can be transmitted to the base station via at least one relaying node. Upon detecting the uplink signal transmitted from the mobile terminal to the base station, the relaying node measures strength of the detected signal and analyzes uplink channel status or acquirable data rate between the relaying node itself and the mobile terminal in steps S514 and S516. The strength of the uplink signal can be one of a RSSI and a CINR. After analyzing the data rate in step S516, the relaying node sends to the base station a UCQI report message having a UCQI with the uplink channel status and data rate in step S518.

The relaying node can send multiple UCQI report messages after binding at stated periods, or can send the UCQI report message to the base station using an algorithm for reducing a size of the UCQI report message to reduce overhead of the system. The algorithm for binding multiple UCQI report messages or reducing a size of the UCQI report message will be described in FIG. 6.

The base station can detect uplink channel status between the relaying node and the mobile terminal, included in the UCQI report message, and can also directly receive an uplink signal from the mobile terminal. That is, the base station receives the uplink signal transmitted by the mobile terminal via two paths: a path of mobile terminal (MT)→base station (BS) and another path of mobile terminal (MT)→relaying node (RN)→base station (BS).

The base station can detect CINR, channel quality, and data rate between the nodes, depending on the uplink signal received via the two paths.

After step S518, upon receipt of the relaying request message from the base station, the relaying node determines whether to perform relaying in steps S520 and S522. The relaying request message is a message used for relaying data transmitted/received to/from the mobile terminal, and is a message in which the relaying node requests the data relaying. That is, in order to deliver the data transmitted by the mobile terminal to the base station via the relaying node, or an intermediate node, instead of directly delivering the data to the base station, the base station provides the data to the relaying node. Upon receipt of the relaying request message, the relaying node determines the amount of resources allocated thereto, and whether relaying is possible or whether the relaying does not affect Quality of Service (QoS) of other mobile terminals, when it desires to relay the data transmitted from the mobile terminal.

After step S522, if relaying is possible, the relaying node sends a relaying response message indicating possibility of the relaying to the base station in steps S524 and S526. However, if relaying is impossible, the relaying node sends a message indicating impossibility of the relaying to the base station in steps S524 and S528. After steps S526 and S528, upon receipt of newly configured broadcast information from the base station, the relaying node relays the data transmitted/received by the mobile terminal based on the received broadcast information in step S530.

Alternatively, the relaying request message may be sent to the base station by the relaying node. In this case, the base station provides information indicating its acceptance/non-acceptance of relaying by sending a relaying response message.

Figure 6:
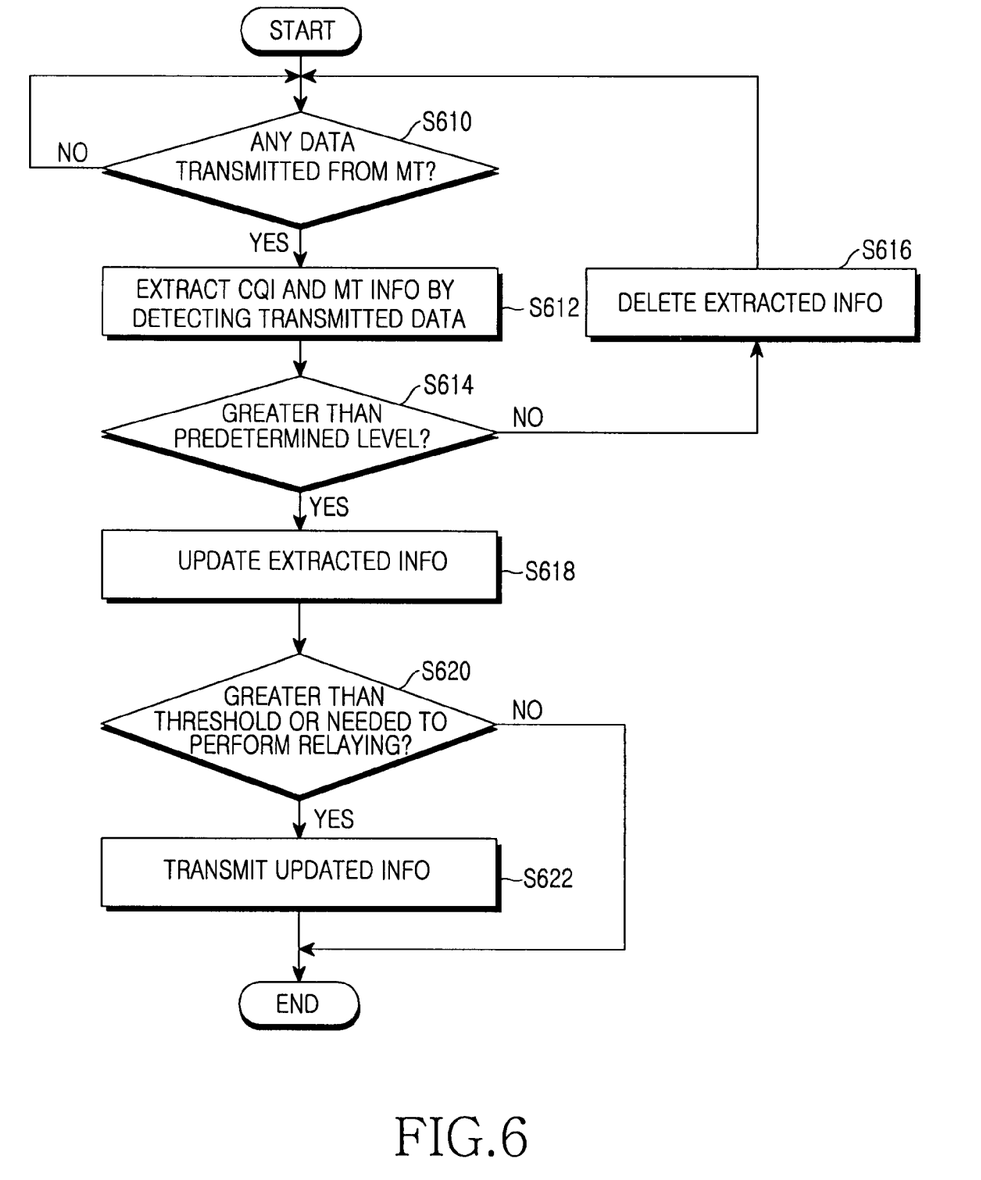
FIG. 6 is a flowchart illustrating a CQI transmission method of a relaying node according to an embodiment of the present invention.

FIG. 6 is a flowchart illustrating a CQI transmission method of a relaying node according to an exemplary embodiment of the present invention.

With reference to FIG. 6, a detailed description will now be made of a method for transmitting CQI of a mobile terminal by a relaying node according to an exemplary embodiment of the present invention.

Upon detecting data transmitted from the mobile terminal (MT), the relaying node extracts CQI and MT information from the detected data in steps S610 and S612. The CQI includes Uplink PDU, pilot signal, and a signal for matching synchronization between the mobile terminal and the relaying node. The extracted MT information includes CID. Alternatively, the relaying node acquires CQI by extracting a pilot in the data transmitted from the mobile terminal. If the CQI extracted in step S612 is greater than or equal to a predetermined level, the relaying node updates the previously stored CQI and MT information in steps S614 and S618. The 'update' refers to an operation of updating the CQI and MT information previously stored in the relaying node with new CQI and MT information, which are greater than the predetermined level, in step S614. If the CQI extracted in step S612 is not greater than or equal to a predetermined level, the extracted information is deleted in step S616. If the information updated in step S618 is greater than a threshold or indicates that the relaying node intends to perform relaying, the relaying node transmits the updated information to the base station in steps S620 and S622.

Proposed Optimal Path Selection Method of Base Station or Relaying Node

With use of the following equations, a description will now be made of a method for measuring CINR and data rate between nodes by a base station or a relaying node and selecting an optimal path depending on the measured values in a mobile communication system according to an exemplary embodiment of the present invention.

CINR γij of a channel between nodes (for example, between the mobile terminal and the base station, between the mobile terminal and the relaying nodes, or between the relaying node and the base station) can be calculated using Equation (1).

$$\gamma_{ij} = \frac{g_{ij}p_i}{\varphi \sum_{k \neq i} g_{kj}p_k + I_j + v_j} \quad (1)$$

In Equation (1), $\gamma_{ij}$ denotes CINR of an interval between a node i and a node j (for example, between mobile terminal and base station, between mobile terminal and relaying node, or between relaying node and base station), $p_i$ denotes transmission power of node i, I denotes external interference, v denotes white Gaussian noise, and φ is assumed to be zero (0) in Time Division Multiple Access (TDMA) and Frequency Division Multiple Access (FDMA) systems.

$$C_{ij} = W \cdot \log_2(1 + \gamma_{ij}) \quad (2)$$

In Equation (2), W denotes the total bandwidth allocated for each individual cell.

Using Equation (1) and Equation (2), an available data rate $C_i$ of a node i can be calculated as shown in Equation (3).

$$\frac{1}{\hat{C}_i} = \min_{j \in N_i} \left[ \frac{1}{\hat{C}_i}, \frac{1}{\hat{C}_{ij}} + \frac{1}{\hat{C}_j} \right] \quad (3)$$

In Equation (3), $C_j$ denotes a data rate between the base station and a node j, and $N_i$ denotes neighboring nodes of the node i.

Using Equation (1), a direct path between a mobile terminal and a base station can be selected in accordance with Equation (4). A reciprocal of the data rate is calculated depending on CINR, taking Shannon capacity into account.

$$b = \operatorname*{argmin}_{i \in B} \left[ \frac{1}{\log_2(1 + \gamma_{B_i M})} \right] \quad (4)$$

A relaying path between the mobile terminal and the base station can be selected using Equation (5).

$$r = \operatorname*{argmin}_{j \in R} \left[ \frac{1}{\log_2(1 + \gamma_{B_j R_j})} + \frac{1}{\log_2(1 + \gamma_{R_j M})} \right] \quad (5)$$

In Equation (4) and Equation (5), $\gamma_{BM}$, $\gamma_{BR}$ and $\gamma_{RM}$ denote CINR from the mobile terminal to the base station, CINR from the relaying node to the base station, and CINR from the mobile terminal to the relaying node, respectively.

Using Equation (1)~Equation (5), the base station can select an optimal path to the mobile terminal. The optimal path can be selected using Equation (6).

$$\min\left[\frac{1}{\log_2(1+\gamma_{B_bM})}, \frac{1}{\log_2(1+\gamma_{B_rR_r})} + \frac{1}{\log_2(1+\gamma_{R_rM})}\right] \quad (6)$$

As described above, the base station or the relaying node according to exemplary embodiments of the present invention can detect CINR, acquirable data rate and optimal path between the corresponding node itself and the neighboring node, using the foregoing equations. Although a description has been made herein of the method in which the base station selects the optimal path, by way of example, every relaying node in the cell can also detect CINR, acquirable data rate and optimal path between the corresponding node itself and a neighboring node in the same manner.

As is apparent from the foregoing description, exemplary embodiments of the present invention provide a scheme in which the base station or the relaying node selects an optimal relaying path in the mobile communication system, thereby contributing to an increase in the system capacity and an increase in throughput of the mobile terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for setting a path by a base station in a mobile communication system, the method comprising:
   receiving a signal directly from a mobile terminal, and measuring a quality of a link on a direct path between the base station and the mobile terminal using the received signal by measuring the data rate and a noise level of the link on the direct path;
   receiving a signal via at least one relaying node, and calculating a quality of an entire relayed path from the mobile terminal to the base station via the at least one relaying node by measuring the data rate and the noise level of each link on the entire relayed path based on the signal received via the at least one relaying node;
   comparing the data rate and the noise level of each link on the entire relayed path with the data rate and noise level of the link on the direct path, and determining an optimal path having an optimal combination of data rate and noise level, from among the direct path and the entire relayed path;
   sending a relaying request message to a relaying node corresponding to the optimal path;
   receiving a relaying response message from the relaying node;
   configuring broadcast information based on the relaying response message received from the relaying node; and
   broadcasting the broadcast information including information on the optimal path.

2. The method of claim 1, further comprising:
   updating previously stored routing information based on a changed optimal path, and broadcasting broadcast information including the information on the optimal path and the updated routing information.

3. The method of claim 1, wherein the receiving the relaying response message comprises:
   receiving the relaying response message indicating approval of relaying from the relaying node, updating previously stored routing information, and broadcasting broadcast information including the information on the optimal path and the updated routing information.

4. The method of claim 1, wherein a routing path between the base station and the relaying node is at least one of previously set and configured using link quality information broadcasted by the relaying node.

5. The method of claim 4, wherein the link quality information comprises at least one of information regarding a path over which the signal is transmitted, unique information of the relaying node, hop information between nodes, and channel quality information between the nodes.

6. The method of claim 1, wherein the relaying request message comprises at least one of an identifier (ID) of the relaying node, an ID of the mobile terminal, and an Uplink Interval Usage Code (UIUC) and a Downlink Interval Usage Code (DIUC) to be used for relying, based on the signal received via the at least one relaying node.

7. The method of claim 6, wherein the UIUC and DIUC comprise information on modulation, coding, and error correcting.

8. The method of claim 1, wherein the relaying response message comprises at least one of a confirmation code for the relaying request, a direction field used for identifying an uplink or a downlink, an identifier (ID) of the relaying node, and a connection ID (CID) of the mobile terminal.

9. The method of claim 1, wherein the quality of the link is measured depending on at least one of channel status, channel quality, and a Carrier-to-Interference Noise Ratio (CINR) of each node.

10. The method of claim 1, wherein the optimal path indicates a link comprising a higher data rate determined as a result of comparing a data rate obtained while taking into account Carrier-to-Interference Noise Ration (CINR) of the directly connected link with a data rate of the entire path obtained while taking into account CINR of each link.

11. The method of claim 1, wherein a reciprocal of the data rate of the directly connected link is calculated taking Shannon capacity into account using the following equation, $$b = \underset{i \in B}{\operatorname{argmin}}\left[\frac{1}{\log_2(1+\gamma_{B_iM})}\right]$$

where $\gamma_{BM}$ denotes CINR between a base station and a mobile terminal.

12. The method of claim 1, wherein a reciprocal of the data rate determined while taking quality of each link into account is calculated using the following equation, $$r = \underset{j \in R}{\operatorname{argmin}}\left[\frac{1}{\log_2(1+\gamma_{B_jR_j})} + \frac{1}{\log_2(1+\gamma_{R_jM})}\right]$$

where $\gamma_{BR}$ denotes a CINR from a relaying node to a base station, and $\gamma_{RM}$ denotes a CINR from a mobile terminal to a relaying node.

13. The method of claim 1, wherein the optimal path is determined using the following equation, $$\min\left[\frac{1}{\log_2(1+\gamma_{B_bM})}, \frac{1}{\log_2(1+\gamma_{B_rR_r})} + \frac{1}{\log_2(1+\gamma_{R_rM})}\right]$$

where $\gamma_{BM}$ denotes a CINR of a link between a mobile terminal and a base station, $\gamma_{BR}$ denotes a CINR of a link between a relaying node and a base station, and $\gamma_{RM}$ denotes a CINR of a link between a mobile terminal and a relaying nodes.

14. The method of claim 1, wherein no relay nodes are included in the direct path between the base station and the mobile terminal, and at least one relay node is included in the relayed path between the base station and the mobile terminal.

15. A mobile communication system comprising:
a mobile terminal for transmitting an uplink signal;
a relaying node for measuring quality of a channel to the mobile terminal by detecting the uplink signal, and transmitting information including the measured quality to a base station; and
the base station for measuring a quality of an entire relayed channel from the base station to the mobile station via the relaying node by measuring a data rate and a noise level of each link on the relayed channel based on the information received from the relaying node, measuring a quality of a direct channel to the mobile terminal using an uplink signal directly transmitted from the mobile terminal by measuring the data rate and the noise level of the link on the direct channel, comparing the measured data rate and noise level of the direct channel to the mobile terminal with the measured data rate and noise level of each link of the relayed channel to the mobile terminal through the relaying node, determining an optimal path having an optimal combination of data rate and noise level, from among the direct path and the entire relayed path, sending a relaying request message to a relaying node corresponding to the optimal path, receiving a relaying response message from the relaying node, configuring broadcast information based on the relayed response message received from the relaying node, and broadcasting the broadcast information including information on the optimal path.

16. The mobile communication system of claim 15, wherein the optimal path indicates a link comprising a higher data rate determined as a result of comparing a data rate obtained while taking into account Carrier-to-Interference Noise Ratio (CINR) of the link directly connected to the mobile terminal with a data rate of an entire path obtained while taking into account CINR of each link connected to the relaying node that has detected the signal transmitted by the mobile terminal.

17. The mobile communication system of claim 15, wherein a routing path between the base station and the relaying node is configured, depending on channel quality information broadcast by the relaying node, wherein channel quality information comprises at least one of path information of the relaying node, unique information of the relaying node, hop information between nodes, and channel quality level between the nodes.

18. A method for relaying data in a mobile communication system, the method comprising:
transmitting, by a mobile terminal, an uplink signal;
measuring, by a relaying node, quality of a channel to the mobile terminal by detecting the uplink signal, and transmitting information including the measured quality to a base station; and
measuring, by the base station, a quality of an entire relayed channel from the base station to the mobile terminal via the relaying node by measuring a data rate and a noise level of each link on the relayed channel based on the information received from the relaying node, measuring a quality of a direct channel to the mobile terminal using an uplink signal directly transmitted from the mobile terminal by measuring a data rate and a noise level of the link on the direct channel, comparing the measured data rate and noise level of the direct channel to the mobile terminal with the measured data rate and noise level of each link of the relayed channel to the mobile terminal through the relaying node, determining which of the two channels has an optimal combination of data rate and noise level, sending a relaying request message to a relaying node corresponding to the optimal path, receiving a relaying response message from the relaying node, configuring broadcast information based on the relaying response message received from the relaying node, and broadcasting the broadcast information via the optimal path.

19. The method of claim 18, wherein the optimal path indicates a link comprising a higher data rate determined as a result of comparing a data rate obtained while taking into account Carrier-to-Interference Noise Ratio (CINR) of the link directly connected to the mobile terminal with a data rate of an entire path obtained while taking into account CINR of each link connected to the relaying node that has detected the signal transmitted by the mobile terminal.

20. The method of claim 18, wherein a routing path between the base station and the relaying node is configured, depending on channel quality information broadcast by the relaying node, wherein channel quality information comprises at least one of path information of the relaying node, unique information of the relaying node, hop information between nodes, and channel quality level between the nodes.

* * * * *